(12) United States Patent
Kessler et al.

(10) Patent No.: US 6,603,336 B1
(45) Date of Patent: Aug. 5, 2003

(54) SIGNAL DURATION REPRESENTATION BY CONFORMATIONAL CLOCK CYCLES IN DIFFERENT TIME DOMAINS

(75) Inventors: Sergei Kessler, Migdal Ha'emek (IL); Asher Maimon, Ra'anana (IL)

(73) Assignee: Conexant Systems Inc., Newport Beach, CA (US)

( * ) Notice: Subject to any disclaimer, the term of this patent is extended or adjusted under 35 U.S.C. 154(b) by 0 days.

(21) Appl. No.: 09/951,714

(22) Filed: Sep. 14, 2001

Related U.S. Application Data

(60) Provisional application No. 60/232,554, filed on Sep. 14, 2000.

(51) Int. Cl.[7] .................................................. H03L 7/00
(52) U.S. Cl. ........................................ 327/145; 713/400
(58) Field of Search ................................ 327/145, 403; 713/400; 375/358, 366

(56) References Cited

U.S. PATENT DOCUMENTS

| | | | | |
|---|---|---|---|---|
| 5,602,878 A | * | 2/1997 | Cross | 375/454 |
| 5,961,649 A | * | 10/1999 | Khandekar et al. | 713/400 |
| 6,112,307 A | * | 8/2000 | Ajanovic et al. | 713/400 |

* cited by examiner

*Primary Examiner*—Timothy P. Callahan
*Assistant Examiner*—An T. Luu
(74) *Attorney, Agent, or Firm*—Edward Langer, Pat. Atty.; Shiboleth, Yisraeli, Roberts, Zisman & Co.

(57) ABSTRACT

Circuitry and methodology for transferring a representation of a data signal between clock domains. In particular, the disclosure teaches a method for creating representations of signals input from a slow clock domain into a fast clock domain and vice versa. The methods and apparatus use a RAM-free architecture which may be easily incorporated into integrated circuits to enhance efficiency.

7 Claims, 7 Drawing Sheets

SIGNAL DURATION REPRESENTATION BY CONFORMATIONAL CLOCK CYCLES IN DIFFERENT TIME DOMAINS

CROSS-REFERENCE TO RELATED APPLICATIONS

The present application claims the priority of Provisional Application Serial No. 60/232,554, filed Sep. 14, 2000, in accordance with 35 USC §120.

FIELD OF THE INVENTION

The present invention relates to improved electronic circuits for the transmission of data between different clock domains. More particularly, the present invention relates to electronic circuits useful for the conformational representation of signals communicated between parts of circuits having different frequency clocks.

BACKGROUND OF THE INVENTION

Many electronic circuits and domains within circuits operate at rates which are determined by clock cycles generated at a particular domain clock frequency and transmitted to them. The term clock domain is used hereinunder to mean those parts of an electronic circuit that operate at the rate of a particular clock. These clock frequencies often vary among said clocks domains, varying accordingly the operating frequencies of the circuits in their domains. It is often necessary to generate a digital representation of the duration of a signal, expressed in terms of the number of clock cycles of its domain of origin, represented by signals of that domain frequency, and to transmit this digital representation to a destination clock domain, while converting the digital representation, generated by the origin domain clock, to that of the destination domain clock frequency.

In the past, when a signal needed to be transmitted from a fast clock domain to a slow clock domain, the signal would first need to be written by a processor from the fast clock domain to random access memory across a bus. Then a processor in the slow clock domain could read the signal across the bus from the random access memory at its own slow clock speed. However, this architecture and process requires a large number of read/write operations which directly affects the overall efficiency and performance of a system so designed.

SUMMARY OF THE INVENTION

The conversion of the transmitted digital representation of the number of clock cycles forming a signal from one clock domain frequency into another clock domain frequency, while retaining the number of cycles, is called hereinunder "conformation".

As alluded to above, conformation poses problems, and particularly in the two following cases:

transmission of signal representation by slow clock signals (hereinbelow LF), i.e. long clock cycles, to a fast clock signal, short clock cycle domain (hereinbelow HF). In this case, some or all of the LF clock cycles may be sampled more than once by an HF domain device, leading to erroneous interpretation of the signal by the HF domain; and transmission of signal duration representation by HF clock cycles to an LF domain. In this case, sampling of HF clock cycles by an LF clocked device may lead to erroneous interpretation of the signal as some of the short HF cycles will not be sampled by the LF device at all or an HF signal that is not a full integer multiple of LF cycles in length will be assigned an incorrect length by the LF device.

It is the purpose of the present invention to offer efficient circuits that overcome the aforementioned problems.

This is accomplished by the following two kinds of methods:

[1] For transmitting a data signal from a fast clock domain directly to a slow clock domain, a circuit, which bridges the two domains, detects the presence or absence of signal at every clock cycle in the fast domain, presence or absence being assigned a value, e.g. high vs. low (or 1 vs. 0) for each clock cycle. A plurality of the clock signal detection values is transmitted in parallel to a counter in the slow clock domain wherein each clock signal detection value is recorded as being a high or a low, and wherein the total number of detected high values or detected low values is output as a binary number by counter, thus informing the slow clock domain of the true number of clock cycles of which the signal is comprised; and

[2] For transmitting a data signal from a slow clock domain directly to a fast clock domain, a circuit which bridges the two domains comprises, in the slow clock domain, an edge detector for detecting the rising edge or falling edge of an incoming signal. When the edge detector detects a signal's leading edge, it causes the reversal of the state of flip-flops in both the slow domain and the fast domain, thereby signifying advent of a signal. Reversal of the flip-flops in the slow domain for each clock cycle when a signal is passing, is detected in the fast domain and understood by the fast domain as being caused by a new slow clock cycle, thereby sensitizing the fast clock domain to the beginning and ending of slow clock cycles which it would otherwise lump together as being a single clock cycle.

DETAILED DESCRIPTION OF THE INVENTION

Figure 1:
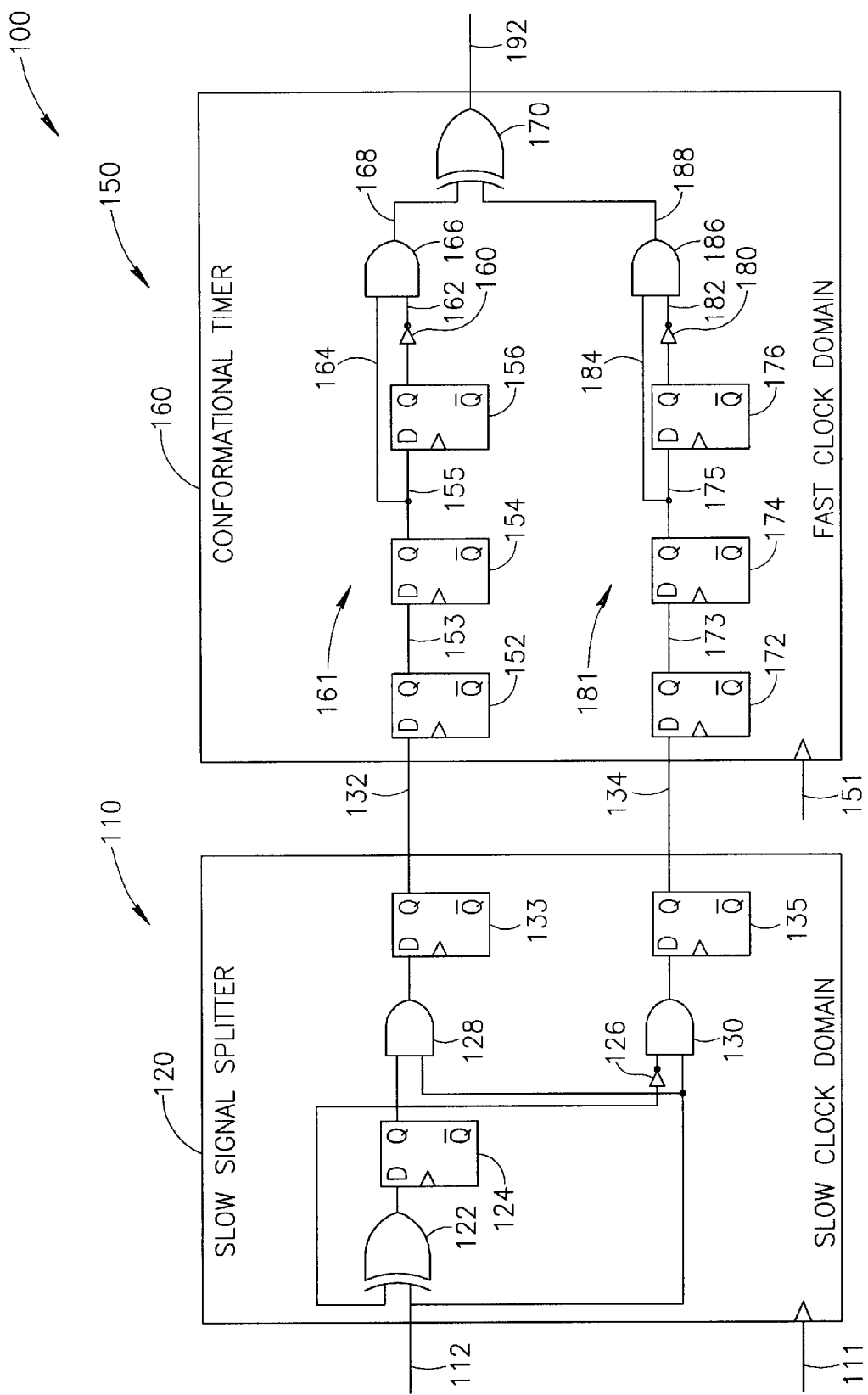
FIG. 1 is a block diagram of a conformational timer circuit for the conformational representation of signals generated in a slow-clock domain and transmitted to a fast-clock domain.

Referring now to FIG. 1, block diagram 100 depicts an exemplary embodiment of a circuit for conformational representation of signal 112. Signal 112 originates in a slow-clock domain 110, which includes Slow Signal Splitter 120 (hereinbelow "SSS") for the processing of signal 112, whose processed output is transmitted into HF domain 150. HF domain 150 includes conformational timer 160 (hereinbelow "SYN"). Components of slow-clock domain 110 are clocked by LF cycles from LF clock (not shown), applied by lead 111. Components of slow-clock domain 150 are clocked by HF cycles of HF clock (not shown) applied by lead 151. Incoming signal 112, to be conformationally timed, is applied to a SSS 120. SSS 120 comprises a double-input modulo-2 adder XOR gate 122, an feedback flip-flop 124, an inverter 126, and two double-input AND gates 128 and 130.

Incoming signal 112, having a duration of several LF line 111 clock cycles, is an input into AND gates 128 and 130 and into XOR gate 122. XOR gate 122 output is applied to the D input terminal of feedback flip-flop 124. The flip-flops of this embodiment are assumed to be of rising edge logic, although other logic could also be used. The first output of port Q of feedback flip-flop 124 is delayed by one LF clock period relative to signal 112, and is:

applied as a second input into AND gate 128;
applied as a second input into AND gate 130 after its inversion by inverter 126; and is
fed back to constitute the second input into XOR gate 122. As long as signal 112 is "1" (logical high), one of the outputs of gates 128 and 130 must be "1" (logical high) and the other must be "0" (logical low), generating complementary outputs of logical high and of logical low, respectively. The output of gate 128, applied to lead 132, is named inc_odd_slow, and the output of gate 130, applied to lead 134, is named inc_even_slow. These outputs alternate at one half of the LF clock frequency as long as signal 112 is logical high.

Referring now to fast clock domain 150 which includes:
HF clock output lead 151, and
conformational timer 160.
Conformational timer 160 comprises of:
Odd branch 161, its input lead 132 and its output lead 168,
Even branch 181, its input lead 134 and its output lead 188,
XOR gate 170, its input leads 168 and 188, and its output lead 192.

XOR gate 170 output, applied to lead 192, is the conformationally timed signal that constitutes this inventive circuit output.

Referring now to the operation of odd branch 161, lead 132 output inc_odd_slow is applied to the D terminal of flip-flop 152, whose Q terminal output is applied to the D terminal of flip-flop 154. Two serially connected flip-flops 152 and 154 are needed due to signal stability reasons, as is known. The Q terminal output of flipflop 154 is applied both to the D terminal of flip-flop 156 and to one input terminal of a two terminal AND gate 166. The Q terminal output of flip-flop 156 is inverted by inverter 160, and the output of inverter 160 is applied to the other input terminal of gate 166 via lead 162. The output of terminal Q of flip-flop 154 is delayed by two rising edges of HF clock signals behind output 132, and the output of terminal Q of flip-flop 156 is delayed by three rising edges of HF clock signals behind output 132, i.e. one HF rising edge behind flip-flop 154. The output of AND gate 166 is high only when the output of flip-flop 154 is high and the output of gate 156 is low, i.e. if the output cycle at the two rising edges of HF period delay is high while the output cycle at the three rising edges of delay is low. This occurs when the output of line 132 changed from low to high between these two rising edges.

The operation of even branch 181 is similar to the operation of odd branch 161. Lead 134 output inc_even_slow is applied to the D terminal of flip-flop 172, whose Q terminal output is applied to the D terminal of flip-flop 174. Two serially connected flip-flops 172 and 174 are needed due to signal stability reasons, as is known. The Q terminal output of flip-flop 174 is applied to the D terminal of flip-flop 176 and to one input terminal of a two terminal AND gate 186. The Q terminal output of flip-flop 176 is inverted by inverter 180 and the output of inverter 180 is applied via lead 182 to the other input terminal of gate 186. The output of terminal Q of flip-flop 184 is delayed by two rising edges of HF clock signals behind the output of 134 and the output of terminal Q of flip-flop 176 is delayed by three rising edges of HF clock signals behind the output of 134, i.e. one HF period behind flip-flop 174. Only if the output of flip-flop 174 is high while the output of gate 176 is low, the output of AND gate 186 is high, i.e. the output cycle at the two HF period delay is high while the output cycle at the three cycle delay is low. This occurs when the output of line 134 changed from low to high between these two cycles.

Figure 2:
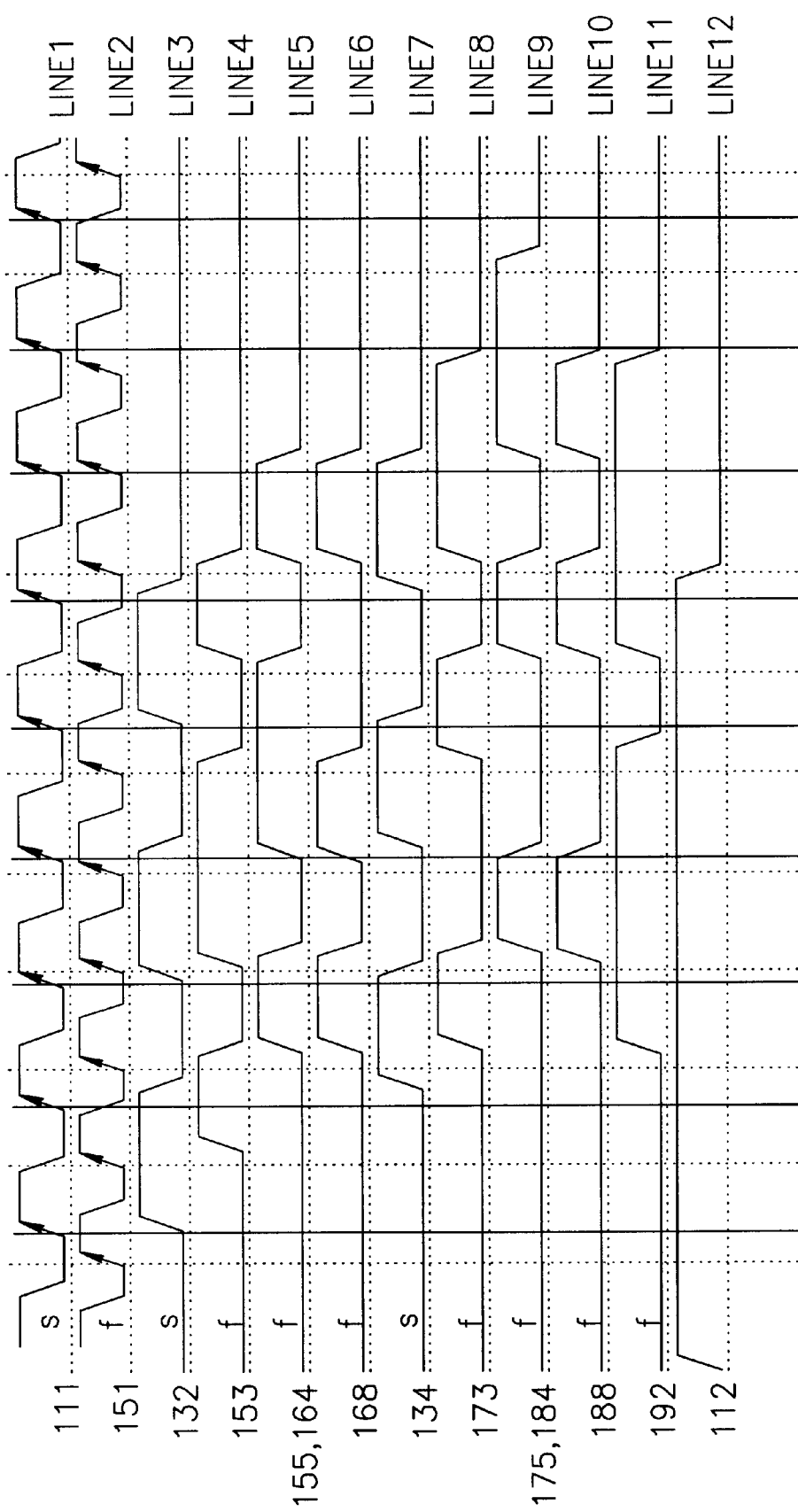
FIG. 2 is a timing signal relationship diagram of the conformational timing circuit shown in FIG. 1.

Referring now to FIG. 2 of the timing diagrams of various electrical signals shown in FIG. 1, line 1 shows the logical levels of the LF clock cycles, of 77.76 Mhz in this embodiment, and line 2 shows the logical levels of the HF clock cycles, of 100 Mhz in this embodiment. Full vertical lines mark the start of each LF cycle, while dotted vertical lines mark the start of each HF cycle. Line 3 shows the logical levels of the inc_odd_slow signal, lead 132, represented by cycles of one half of the LF frequency and line 7 shows the logical levels of inc__even_slow signal, lead 134. Line 4 shows the output of odd_clkd1 of Q terminal of flip-flop 152 into lead 153, rising to logical high after a logical high of 134 and after rising HF clock signal. Line 5 shows the output of odd_clkd2 of Q terminal of flip-flop 154 to lead 155, delayed by one HF clock signal relative to odd_clkd1, and line 6 depicts the odd branch output odd_cycle into lead 168.

Similarly, Line 7 shows the logical levels of the inc_even_slow signal, lead 134, represented by cycles of one half of the LF frequency and line 8 shows the logical levels of inc_even_slow signal. Line 8 shows the output of even_clkd1 of flip-flop 172 Q terminal into lead 173, rising to logical high after a logical high of 134 and after rising HF clock signal. Line 9 shows the output of even_clkd2 of flip-flop 174 Q terminal into lead 175, delayed by one HF clock signal relative to even_clkd1, and line 10 depicts the even branch output even_cycle, lead 188. Line 11 depicts the inc_fast output of conformational timer 160 into lead 192 of this inventive apparatus 100.

Figure 3A:
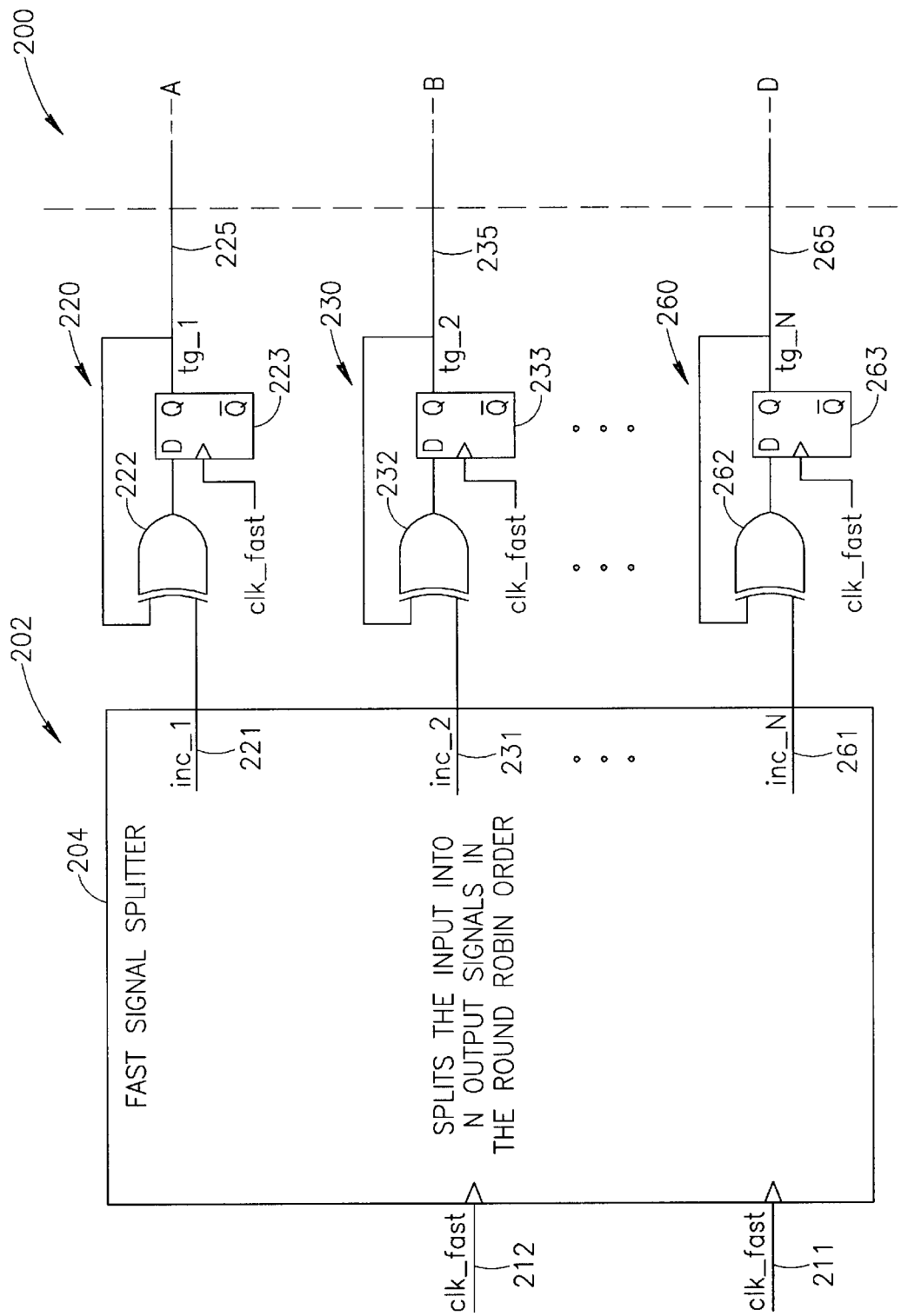
FIG. 3a is a block diagram of the fast-clock domain signal generating portion of a conformational timer circuit in accordance with an exemplary embodiment of the present invention.
Figure 3B:
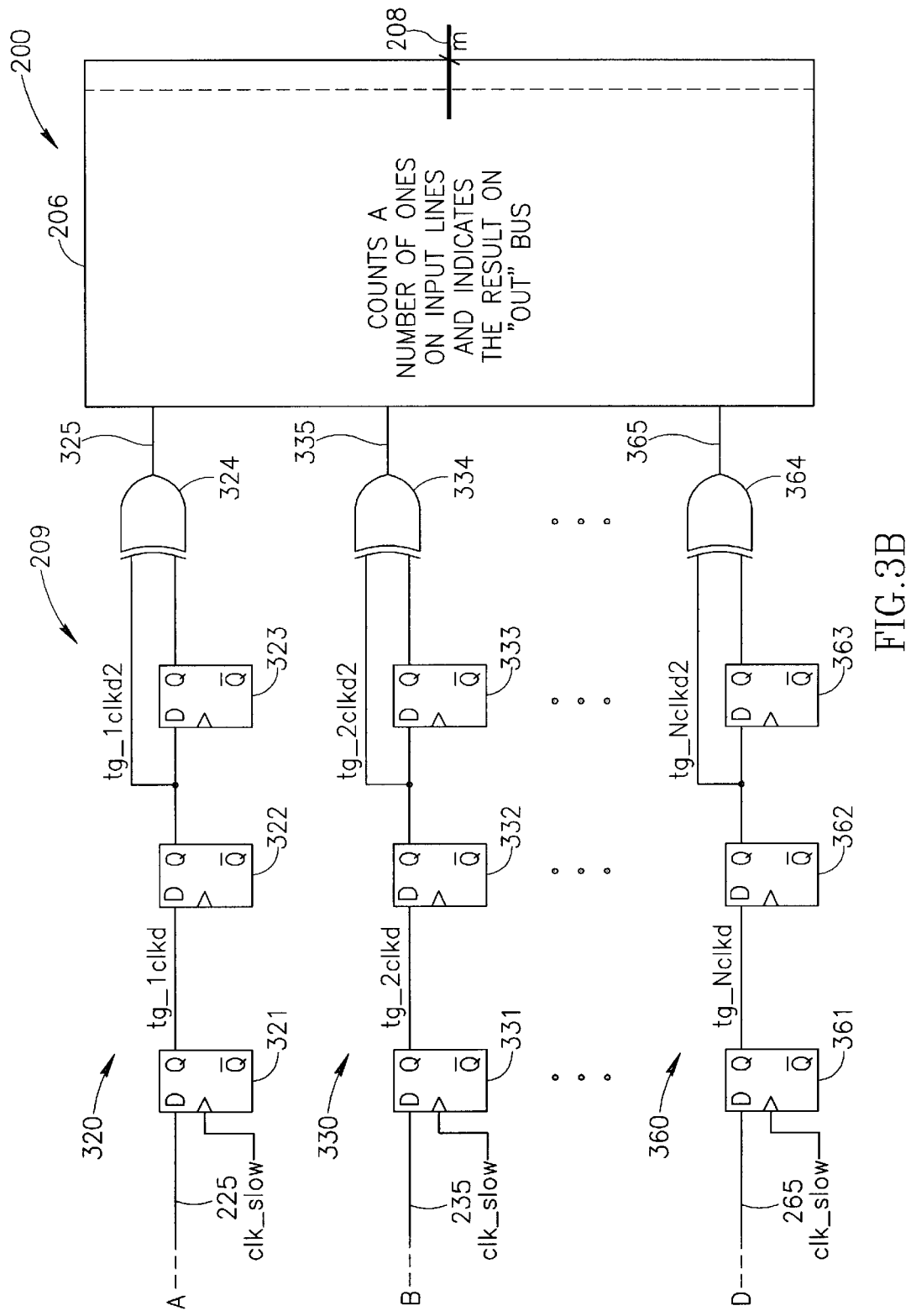
FIG. 3b is a block diagram of the slow-clock domain portion of a conformational timer circuit for processing signals generated in and transmitted from the fast clock domain shown in FIG. 3a, hereinabove, in accordance with an exemplary embodiment of the present invention.

Referring now to FIG. 3, depicting a block diagram 200 of an exemplary embodiment circuit for the conformational representation of signal 212 originating in a HF domain 202 and transmitted into a LF domain 209.

The detailed embodiment of the circuit depends on the integer numbers N and m, defined by the relationships:

$$N=INT(HF/LF)+1 \tag{1}$$

$$m>\log_2(N) \tag{2}$$

Where N designates the number of the parallel output leads of Fast Signal Splitter 204 (FSS hereinbelow) for the splitting of signal 212 and the number m designates the number of output lines in bus 208, m is preferably the smallest number satisfying relationship (2), or:

$$m=INT(\log_2(N))+1 \tag{2a}$$

Bus 208 of m leads permits the log(2) representation in the LF domain of the number of HF cycles generated during one LF cycle duration. HF domain 202 also comprises of an output lead 211 of an HF clock (not shown). Also comprised in 202 is an N-outputs FSS 204 for the splitting of signal 212 into N outputs 221, 231, 241, 251, 261, N equals five in this exemplary embodiment. Each one of said N outputs is applied to a corresponding module of N similar HF modules, designated respectively 220 through 260. Each one of the outputs of said N HF modules is applied to a corresponding lead of N similar LF modules 320 through 360, respectively. The N outputs of said LF modules are applied to LF counter 206, generating in m-lined bus 208 a sequence of LF cycle-long binary representations of the number of HF cycle duration of signal 212 generated during each LF cycle.

Each one of the N HF modules 220 through 260 comprises a two-input XOR gate, numbered 222 through 262 in the respective modules, and an HF flip-flop, numbered 223 through 263 respectively, i.e. the HF flip-flop number equals the XOR gate number of its module increased by 1. The output of each group's XOR gate is applied to the D terminal of its respective HF flip-flop.

N LF modules, numbered 320 to 360 are provided and are connected to the Q outputs of HF flip-flops 223 to 263 by leads 225 through 265, respectively. Each LF module comprises three serially connected LF flip-flops, first LF flip-flops numbered 321 to 361, second LF flip-flops numbered 322 to 362 and third LF flip-flops numbered 323 to 363, respectively. Also included are two-input LF modulo-2 adders, which may be constituted by LF XOR gates numbered 324 to 364, respectively. Lead 311 applies LF cycles to the clock terminal of any LF-clocked component.

The output of the Q terminal of each one of the respective HF flip-flops 223 through 263 is applied to the D terminal of the respective first LF flip-flops 321 to 361, the outputs of the Q terminals of the first LF flip-flops are applied to the respective D terminals of the second LF flip-flops 322 to 362 and the outputs of the Q terminals of the second LF flip-flops are applied to respective D terminals of the third LF flip-flops 323 to 363 and to one input terminal of a respective two-input LF XOR gate 324 to 364. The outputs of the Q terminals of the third LF flip-flops are applied to the respective second terminal of LF XOR gates 324 to 364. The outputs of LF XOR gates 324 through 364 are applied in parallel through leads 325 through 365, respectively, to N input terminals of adder 206. Adder 206 outputs the number of input "1"'s, representing the duration of signal 212, expressed in number of HF cycles, by the binary output of the L lines of bus 208.

FSS 204 outputs a round robin sequence of outputs of one HF cycle-length duration in N lines 223 through 263, said outputs being staggered by one HF cycle length and generated as long as line 212 is "1" or logical high. Each one of the logical high outputs of lines 223 through 263 is applied to the D input terminal of first flip-flops 321 through 361, whose Q terminal outputs are applied to the D input terminals of second flip-flops 322 through 362. First and second flip-flops are provided due to signal stability, as is known. The Q terminal output of second flip-flops 322 through 362 is applied to one input terminal of modulo-2 adders 324 through 364, respectively. The Q terminal outputs of third LF flip-flops 323 to 363 is applied to the second input terminal of the respective LF XOR gates 324 to 364. The output of the LF XOR gates is logical high if the exectly one output of the second and the third LF flip-flops is logical high, i.e. if a change in the logical levels of said flip-flops occurred during the one LF cycle duration corresponding to the HF signal output of the respective HF line. The logical output levels in bus 208 of adder 206 represent the number of HF cycles, during which line 212 was logically high, during one LF cycle. This number could be less than N or equal to N. For a line 212 logical high signal duration of P HF cycles, P being less than N. the output representation on bus 208 is P during one LF cycle. For a line 212 logical high signal duration of R HF cycles, R being equal to N, the output representation on bus 208 is N during one LF cycle. For a line 212 logical high signal duration of S HF cycles, S being higher than N, the output representation on bus 208 is N during the integer number T=INT(S/N) of T LF cycles, and equals to (P modulo N) during the next LF cycle. Thus a representation of the HF cycle duration of signal 212 is transmitted to the LF domain and is represented there by the output of adder 206, as represented on bus 208.

Figure 4A:
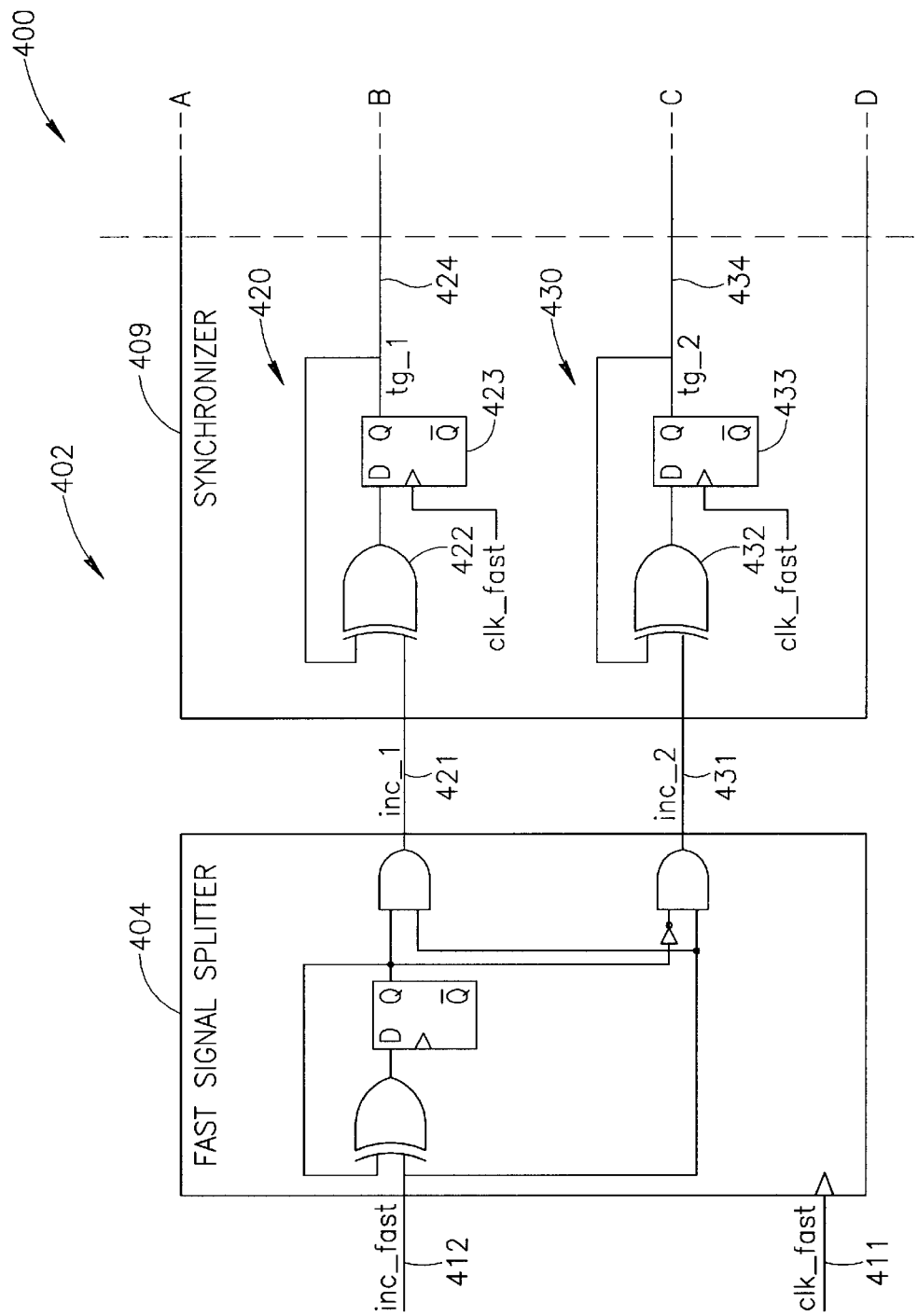
FIG. 4a is a block diagram of the fast-clock domain signal generating portion of a conformational timer circuit in accordance with an exemplary embodiment of the present invention.
Figure 4B:
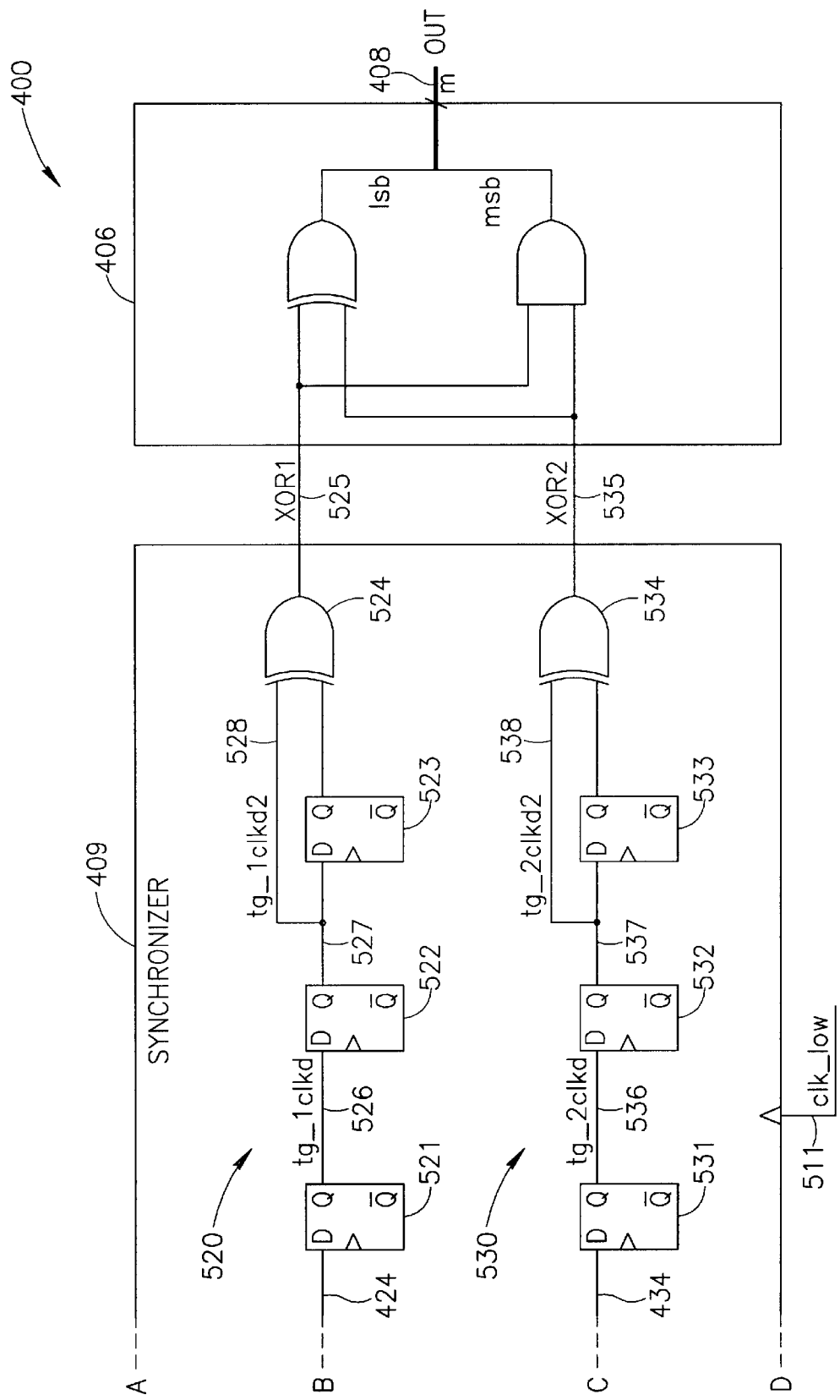
FIG. 4b is a block diagram of the slow-clock domain portion of a conformational timer circuit for processing signals generated in and transmitted from the fast clock domain shown in FIG. 4a, hereinabove, in accordance with an exemplary embodiment of the present invention, wherein the frequency ratio between the domains is less than 2.

Referring now to FIG. 4, a block diagram 400 is depicted of an exemplary embodiment of a circuit for the conformational representation of signal 412 originating in a HE domain 402 and transmitted into a LF domain 409.

The detailed embodiment of the circuit depends on the integer numbers N and m, defined as above by the relationships (1) applied to the values used in the embodiment of FIG. 4:

$$N=INT(100/77.76)+1=2 \tag{1}$$

$$m>\log_2(2) \tag{2}$$

Where N designates the number of the parallel output leads of FSS 404 for the splitting of signal 412, and the number m designates the number of output lines in bus 408 m is preferably the smallest number satisfying relationship (2), or:

$$m=INT(\log_2(2))+1=2 \tag{2a}$$

Bus 408 of two leads or bits permits the log(2) representation in the 77.76 MHz LF domain of the number of 100 MHz HF cycles generated during one LF cycle duration. HF domain 402 also comprises of an HF lead 411 of an HF clock (not shown), applied to the clock terminals of HF components.

Also comprised in 402 is an N-outputs FSS 404, N equals 2 in this exemplary embodiment, for the splitting of signal 412 into N outputs 421, 431. Each one of outputs 421, 431, is applied respectively to one of two similar HF modules 420, 430. Each one of the outputs of said HF modules is applied to a corresponding lead of two LF modules 520, 530, respectively. The two outputs of said LF modules are applied to LF adder 406, generating in a 2-lined bus 408 a sequence of LF cycle-long binary representations of the number of HF cycle duration of signal 412 generated during each LF cycle.

Each one of HF modules com420, 430, comprises a two-input XOR gate, numbered 422, 432, and an HF flip-flop, numbered 223, 233 respectively, i.e. the HF flip-flop number equals the XOR gate number of its module increased by 1. The output of each group's XOR gate is applied to the D terminal of its respective HF flip-flop.

Two LF modules, numbered 520 and 530 are provided, and are connected to the Q outputs of HF flip-flops 423, 433 via leads 424, 434, respectively. Each LF module comprises three serially connected LF flip-flops, first LF flip-flops numbered 521, 531, second LF flip-flops numbered 522 to 532 and third LF flip-flops numbered 523, 533, respectively.

Also included are two-input LF modulo-2 adders, which may be constituted by LF XOR gates numbered 524, 534, respectively. Lead 511 applies LF clock cycles to the clock terminals of LF components.

The output of the Q terminal of each one of the respective synchronizer HF flip-flops is applied to the D terminal of the respective first LF flip-flops 521, 531, the outputs of the Q terminals of the first LF flip-flops are applied to the respective D terminals of second LF flip-flops 522, 532 and the outputs of the Q terminals of the second LF flip-flops are applied to respective D terminals of the third LF flip-flops 523, 533 and to one input terminal of a respective two-input LF XOR gate 524, 534, The outputs of the Q terminals of the third LF flip-flops are applied to the respective second terminal of LF XOR gates 524, 534, the outputs 525, 535 of said LF XOR gates are applied in parallel to N input terminals of adder 406. Adder 406 outputs the number of input "1", representing the duration of signal 412, expressed in number of HF cycles, by the binary output of the m lines of bus 408.

FSS 404 outputs a round robin sequence of outputs of one HF cyclelength duration in N=2 lines 421, 431, said outputs being staggered by one HF cycle length and are generated as long as line 412 is "1" or logical high. The logical high outputs of flip-flops 423, 463, tg_1, tg_2 are applied via leads 424, 434, respectively to the D input terminal of first flip-flops 521, 531, whose Q terminal outputs are applied to the D input terminals of second flip-flops 522, 532. First and second flip-flops are provided due to signal stability, as is known. The Q terminal output of second flip-flops 522 is applied to one input terminal of the two-input terminals of modulo-2 adders, which may be constituted by XOR gates, and which are represented in this embodiment by LF XOR gates 524, 534. The Q terminal outputs of third flip-flops 523, 533 is applied to the second input terminal of the respective LF XOR gates 524, 534. The outputs of the LF XOR gates are logical high if only one output of the second and the third LF flip-flops is logical high, namely, if a change in the logical levels of said flip-flops occurred during the particular LF cycle duration corresponding to the HF signal output of the respective HF line. Line 408 represents the number of HF cycles during which line 412 was logically high throughout one LF cycle. This number could be less than N or equal to N. For a line 412 logical high signal duration of P HF cycles, P being less than N, the output representation on bus 408 is P during one LF cycle. For a line 412 logical high signal duration of R HF cycles, R being equal to N, the output representation on bus 408 is N during one LF cycle. For a line 412 logical high signal duration of S HF cycles, S being higher than N, the output representation on bus 408 is N during the integer number T=INT(S/N) of T LF cycles, and equals to (P modulo N) during the next LF cycle. Thus a representation of the HF cycle duration of signal 412, is transmitted to the LF domain and is represented there by the output of adder 406, as represented on bus 408.

Figure 5:
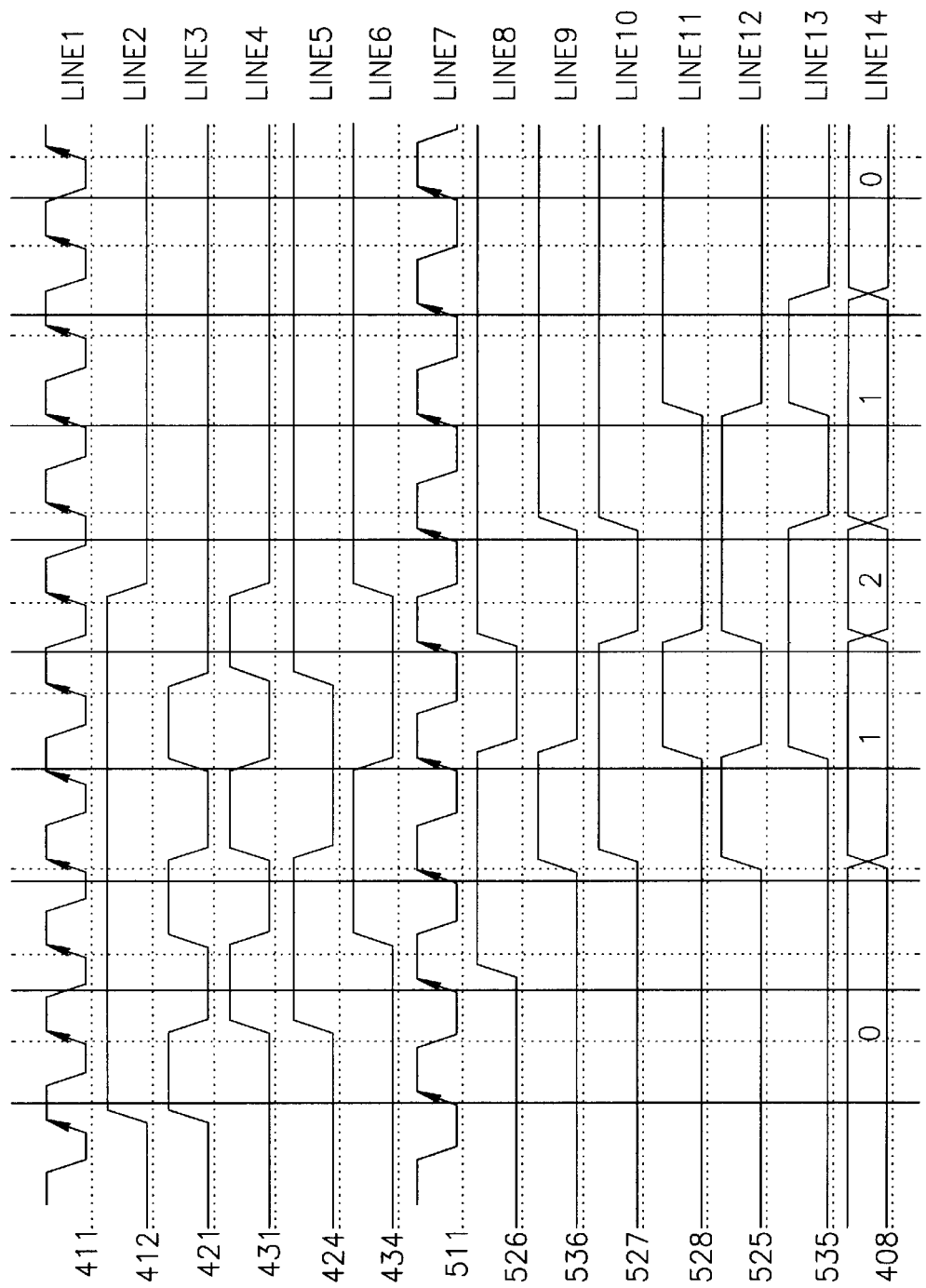
FIG. 5 is a signal relationship wave diagram of the conformational timer shown in FIGS. 4a and 4b, in accordance with an exemplary embodiment of the present invention.

Referring now to FIG. 5 of timing diagrams of various electrical signals of another embodiment wherein N=2, line 1 shows the logical levels of the HF clock cycles, of 100.0 Mhz in this embodiment, and line 7 shows the logical levels of the LF clock cycles, of 77.76 Mhz in this embodiment. Full vertical lines mark the end of each LF cycle, while dotted vertical lines mark the end of each HF cycle. Line 2 shows the logical levels of signal 412. Lines 3 and 4 show the logical levels of the inc_1 and inc_2 of leads 421 and 431 outputs respectively. Lines 5,6 show the logical levels of tg_1 and tg_2 of leads 423, 433. Lines 8 and 10 show the output of tg_1clkd1 of Q terminal of flip-flop 521, and of tg 1clkd2 of Q terminal of flip-flop 522. Lines 9 and 11 show the output of tg_2clkd1, tg_2clkd2 of the Q terminals of flip-flops 531, 532. Lines 12 and 13 show the outputs of XOR gates 524, 534, respectively, and line 14 shows the outputs of a two lines bus 408.

Circuits constructed in accordance with the present invention may be particularly useful in communications applications, for example where signal transfer between different protocols may occur. Additionally, many processors may be comprised of several time domains and the present invention may enhance the efficiency of such processors and systems which use such processors, such as computer, networks, routers, servers, communications cards, and the like.

The preceding description of an exemplary embodiment is presented in order to enable a person of ordinary skill in the art to design, manufacture and utilize this invention. Various modifications and adaptations to the exemplary embodiment will be apparent to those skilled in the art, and different modifications may be applied to different embodiments. Therefore, it will be appreciated that the invention is not limited to what has been described hereinbelow merely by way of example. Rather, the invention is limited solely by the claims which follow this description.

We claim:

1. A method for representing a data signal from a fast clock domain directly into a slow clock domain via a circuit, wherein said circuit detects the value of said signal at every clock cycle in said fast domain, and a plurality of said clock signal detection values is transmitted in parallel to at least two cycle number detection modules in said slow clock domain wherein each of said clock signal detection values is recorded as a high or a low, and wherein the total number of said detected high values or said detected low values is counted by a counter and output as a binary number by said counter, whereby said slow clock domain is informed of the number of cycles of said signal in said fast clock domain.

2. A circuit for transmitting a data signal from a slow clock domain to a fast clock domain, wherein an input signal comprising at least one slow clock cycle enters said circuit via a feedback flip-flop and is branched into two signal paths to LF companion AND gates, said LF companion AND gates being so connected in order to output complementary outputs, said feedback flip-flop causing a reversal in the states of said LF companion AND gates with the passage of each clock cycle, wherein said input signal entry and subsequent reversal of the states of said LF companion AND gates provides an indicator to said fast domain of the number of slow clock cycles comprising said input signal.

3. A circuit for transmitting a data signal from a slow clock domain to a fast clock domain according to claim 2, further comprising a conformational timer in said fast domain for receiving input from said LF companion AND gates and for creating and outputting to said fast clock domain an output signal which represents said input signal, said output signal comprising a number of fast clock cycles equal in number to the slow clock cycles comprising said input signal.

4. A circuit for preserving the number of clock cycles in a signal according to claim 1, wherein said fast clock domain has at least two signal change detection modules, for detecting changes in the signal received from said slow clock domain.

5. An integrated circuit including a circuit for transmitting a data signal from a slow clock domain to a fast clock domain, wherein an input signal comprising at least one slow clock cycle enters said circuit via a feedback flip-flop and is branched into two signal paths to LF companion AND gates, said LF companion AND gates being so connected in order to output complementary outputs, said feedback flip-flop causing a reversal in the states of said LF companion AND gates with the passage of each clock cycle, wherein said input signal entry and subsequent reversal of the states of said LF companion AND gates provides an indicator to said fast domain of the number of slow clock cycles comprising said input signal.

6. A chip incorporating a circuit for transmitting a data signal from a slow clock domain to a fast clock domain, wherein an input signal comprising at least one slow clock cycle enters said circuit via a feedback flip-flop and is branched into two signal paths to LF companion AND gates, said LF companion AND gates being so connected in order to output complementary outputs, said feedback flip-flop causing a reversal in the states of said LF companion AND gates with the passage of each clock cycle, wherein said input signal entry and subsequent reversal of the states of said LF companion AND gates provides an indicator to said fast domain of the number of slow clock cycles comprising said input signal.

7. A circuit for representing an input data signal from a fast clock domain directly into a slow clock domain, said circuit comprising a signal value detector for detecting the value of said signal at every clock cycle in said fast domain, said signal value detector being connected to at least two cycle number detection modules in said slow clock domain wherein each of said clock signal detection values is recorded as a high or a low, said cycle number detection modules being connected to a counter-converter for counting recorded signal detection values and for converting said clock signal detection values into a binary number, whereby said slow clock domain receives from said counter-converter a slow clock domain signal having the same number of cycles as said input signal in said fast clock domain.

* * * * *